Patented June 17, 1947

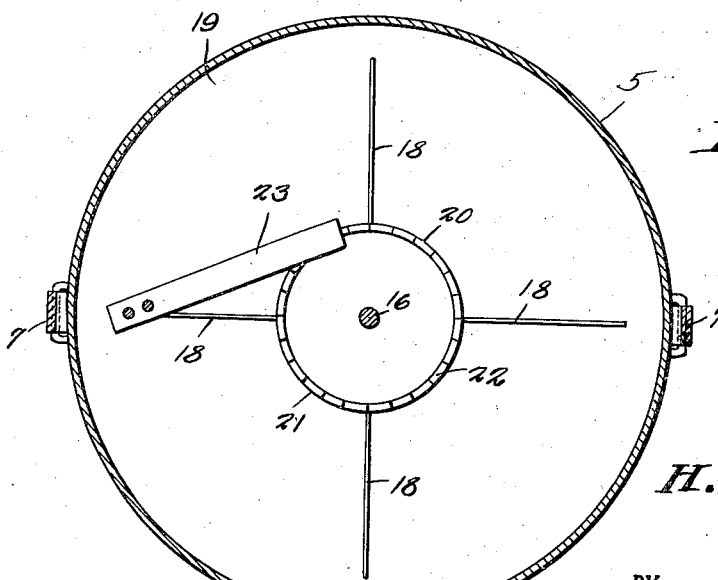

2,422,340

UNITED STATES PATENT OFFICE 2,422,340

VERTICALLY RECIPROCATING AND INTERMITTENTLY ROTATING FOOD CHOPPER

Henry T. Clark, St. Petersburg, Fla.

Application March 20, 1946, Serial No. 655,644

1 Claim. (Cl. 146—69)

This invention relates to food choppers, the primary object of the invention being to provide means whereby the food to be chopped may be placed in a container and by operating a crank, chopping blades will be moved within the container to chop the food.

An important object of the invention is to provide a vertically reciprocating rod carrying blades at its lower end, the rod having means whereby the rod and blades will be rotated predetermined distances with each vertical movement of the reciprocating rod, so that the material held within the container will be properly positioned.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a vertical sectional view through a food chopper constructed in accordance with the invention.

Figure 2 is a sectional view taken on line 2—2 of Figure 1.

Referring to the drawing in detail, the food chopper comprises a body portion which is in the form of a receptacle 5, there being provided a lid 6 for closing the receptacle. The lid fits over the open end of the receptacle and is held in position by means of the pivoted clamping arms 7. Disposed centrally of the lid 6, is a hollow post 8 which is formed with lateral extensions 9 and 10, the lateral extension 9 providing a bearing for the end 11 of the crank 12, which is supported within the extension 10, the crank portion 13 of the crank 12 operating within the hollow post 8. On one end of the crank 12 is the handle 14, by means of which the crank 12 may be rotated.

Mounted on the crank portion 13 is the bearing 15 which is formed with a socket in which the upper end of the rod 16 is positioned, the rod 16 being formed with an annular groove in which the pin 17 is disposed, the pin 17 being also held within a groove formed in the wall of the bore of the bearing 15. Thus it will be seen that the shaft rod 16 may move vertically with the bearing 15 and may rotate with respect to the bearing for purposes to be hereinafter more fully described.

The cutting blades are indicated by the reference character 18, and these blades are secured to the lower end of the rod 16, the cutting blades being of lengths to extend to positions in proximity to the wall of the receptacle 5.

Mounted within the base of the receptacle 5 is a removable chopping board 19 against which the cutting blades 18 operate in chopping the food under treatment.

Secured to the rod 16, is the ratchet disk 20 which is formed with an annular upstanding flange 21 in which ratchet teeth 22 are formed, the ratchet teeth being engaged by the spring arm 23 that is secured to the undersurface of the lid 6, the spring arm being shown as having its free end resting on the teeth 22. By moving the ratchet disk 20 vertically on the shaft, the movement of the rod 16, by the action of the spring arm 23, may be regulated. A set screw indicated at 24, extends through the hub of the ratchet disk and secures the ratchet disk on the rod 16.

In the operation of the device, the food to be chopped is placed in the receptacle 5, and the cover is placed in position on the receptacle. The handle 14 is now rotated, which reciprocates the rod 16, causing the blades 18 to cut the food under treatment.

It will be obvious that with each upward movement of the rod 16, the arm 23 will be flexed upwardly, lengthening the arm which results in a slight rotary movement being imparted to the disk 20, rotating the rod 16 and blades mounted at the lower end thereof. This movement will change the positions of the blades within the receptacle to insure the contents of the receptacle being thoroughly chopped.

What is claimed is:

A food chopper comprising a receptacle, a cover for the receptacle, a hollow post rising from the central portion of the cover, lateral extensions formed on the hollow post, a crank shaft disposed within the hollow extensions, the crank of the shaft operating within the hollow post, a bearing member mounted on the crank shaft, a vertical rod secured to the bearing member, means for connecting the rod and bearing member, whereby said rod rotates with respect to the bearing member, blades secured to the lower end of the shaft and adapted to chop food in the receptacle, said crank shaft adapted to move the rod vertically, and means for rotating the rod with each vertical movement of the rod.

HENRY T. CLARK.

REFERENCES CITED

The following references are of record in the file of this patent:

UNITED STATES PATENTS

| Number | Name | Date |
|---|---|---|
| 152,358 | Gable | June 23, 1874 |
| 137,074 | Hard | Mar. 25, 1873 |
| 295,121 | Hart et al. | Mar. 11, 1884 |
| 235,850 | Bourne | Dec. 28, 1880 |